(12) United States Patent
Shoykhet

(10) Patent No.: US 6,891,308 B2
(45) Date of Patent: May 10, 2005

(54) EXTENDED CORE FOR MOTOR/GENERATOR

(75) Inventor: Boris A. Shoykhet, Beachwood, OH (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 0 days.

(21) Appl. No.: 10/368,122

(22) Filed: Feb. 18, 2003

(65) Prior Publication Data

US 2004/0160140 A1 Aug. 19, 2004

(51) Int. Cl.[7] .................................................. H02K 3/46
(52) U.S. Cl. ....................................... 310/260; 310/254
(58) Field of Search ................................ 310/260, 270, 310/256, 254, 216, 179

(56) References Cited

U.S. PATENT DOCUMENTS

| | | | |
|---|---|---|---|
| 5,243,248 A | | 9/1993 | Benford, deceased et al. ... 310/256 |
| 6,069,431 A | * | 5/2000 | Satoh et al. ................. 310/260 |
| 6,157,109 A | * | 12/2000 | Schiferl et al. ............. 310/254 |
| 6,252,315 B1 | | 6/2001 | Heo ............................. 310/12 |
| 6,445,095 B1 | * | 9/2002 | Liang et al. .................. 310/64 |
| 6,455,977 B2 | * | 9/2002 | Leyvraz et al. ............. 310/254 |
| 6,583,532 B2 | * | 6/2003 | Hein et al. ................... 310/260 |
| 6,664,672 B2 | * | 12/2003 | Kalsi et al. ..................... 310/57 |
| 2001/0030307 A1 | | 10/2001 | Bergstrom et al. ..... 251/129.15 |
| 2004/0119365 A1 | | 6/2004 | Bresnak et al. ............. 310/216 |

OTHER PUBLICATIONS

E. Henestroza, D. Shuman, D.L. Vanecek, E.L. Waldron, S.S. Yu, "A Large Bore Pulsed Quadrupole Magnet for Transport of High Current Beams at Low Energies", 2001, 3 pages.

Heath Hofmann and Seth R. Sanders, "High–Speed Synchronous Reluctance Machine with Minimized Roter Losses", 2000, 9 pages.

* cited by examiner

*Primary Examiner*—Dang Le
(74) *Attorney, Agent, or Firm*—Amin & Turocy LLP; Alexander M. Gerasimow

(57) ABSTRACT

An extended stator core in a motor/generator can be utilized to mitigate losses in end regions of the core and a frame of the motor/generator. To mitigate the losses, the stator core can be extended to a length substantially equivalent to or greater than a length of a magnetically active portion in the rotor. Alternatively, a conventional length stator core can be utilized with a shortened magnetically active portion to mitigate losses in the motor/generator. To mitigate the losses in the core caused by stator winding, the core can be extended to a length substantially equivalent or greater than a length of stator winding.

8 Claims, 8 Drawing Sheets

SUPERCONDUCTING WINDING LENGTH OUTSIDE THE CORE
WITH RESPECT TO A STATOR CORE INNER RADIUS, %

EXTENDED CORE FOR MOTOR/GENERATOR

GOVERNMENT LICENSE RIGHTS

This invention was made with Government support under Cooperative Agreement No. DE-FC36-93CH10580 awarded by the Department of Energy. The Government has certain rights in this invention.

FIELD OF THE INVENTION

The invention described below generally relates to superconducting synchronous machines, permanent magnet machines, and other large air core machines, and more particularly, to systems and methods for axially extending a core to mitigate losses in such large air core machines.

BACKGROUND OF THE INVENTION

Recent advances in superconductivity have led to an increased interest in the development and commercialization of superconducting electromechanical rotating (SER) devices such as large electric generators and large electric motors, including synchronous AC motors. Such devices typically include a superconductive rotor having a vacuum jacket and a stator coaxially surrounding the rotor. The superconducting windings are disposed inside of the vacuum jacket on a winding support structure. The winding support structure and windings are cooled to a cryogenic temperature. One such device is a high temperature superconducting (HTS) electromechanical device which uses a HTS winding in the rotor of the device rather than a low temperature superconducting winding. In the case of a synchronous AC motor, the stator and rotor of the typical SER device are configured such that the rotor is rotated synchronously with the rotating stator magnetic field.

The superconducting synchronous motors generally have air-core geometry meaning that a significant part of magnetic flux passes through non-ferromagnetic materials. It may be because the stator core does not have teeth, the rotor does not have ferromagnetic pole shoes or does not include ferromagnetic materials at all, and so on. Such machines have large air gap, which possess problems with end-winding and core end region eddy current losses due to a much higher than normal leakage fields. Axial fluxes caused by currents flowing in the rotor and stator end windings are sufficiently great to induce significant eddy currents in laminations at each end of a stator core, in core clamping plates and motor frame. The circumferential/radial eddy currents generate high losses in the motors.

Various methods used to minimize eddy current losses in the core end regions are: (1) conducting screens on core end plates to act as flux diverters; (2) profiling an end of the core, e.g., locally increasing the reluctance of the rotor/stator gap; (3) segmentation of the laminations; (4) using narrow slits—"pistoye slots"—in rotor teeth to lengthen a path taken by the eddy currents, thereby increasing path resistance and decreasing current/losses; and (5) using extra coatings of insulating varnish on the laminations. Thus, core end region design is conventionally employed as a compromise between keeping the eddy current losses small yet maintaining adequate magnetic, thermal and mechanical properties.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention provides systems and methods to mitigate losses and improve efficiency in rotating superconducting synchronous machines and permanent magnet machines. Losses in end regions of a core and/or frame are commonly very high in such motors and/or generators. Accordingly, a motor/generator is provided that includes a stator core having an extended length to mitigate flux leakage in an end region of the motor/generator. In particular, the length of the stator core can be extended such that it is substantially the same length of a magnetically active portion of a rotor of the motor/generator. Alternatively, the stator core can be extended to a length that is greater than the length of the magnetically active portion of the rotor.

In a superconducting synchronous machine, the magnetically active portion of the rotor includes an overall length of a superconducting winding, including the end turns. In a permanent magnet machine, the magnetically active portion of the rotor includes the permanent magnets and any ferromagnetic material surrounding the permanent magnets.

An inner diameter of the extended stator core generally increases to correspond with an outer diameter of stator windings. Moreover, the extended stator core can include a variable outside diameter to decrease weight and material costs associated with manufacturing the stator core.

In accordance with another aspect of the present invention, a system and method for reducing a length of a magnetically active portion of a rotor is provided to mitigate losses in an end region of a superconducting synchronous and/or permanent magnet motor/generator. The magnetically active portion of the rotor can have a length that is substantially equivalent to or shorter than a length of a stator core. Alternatively, the magnetically active portion of the rotor can be longer than the stator core by a length ranging from near zero to a value equivalent to about fifty percent of the inner radius of the stator core.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
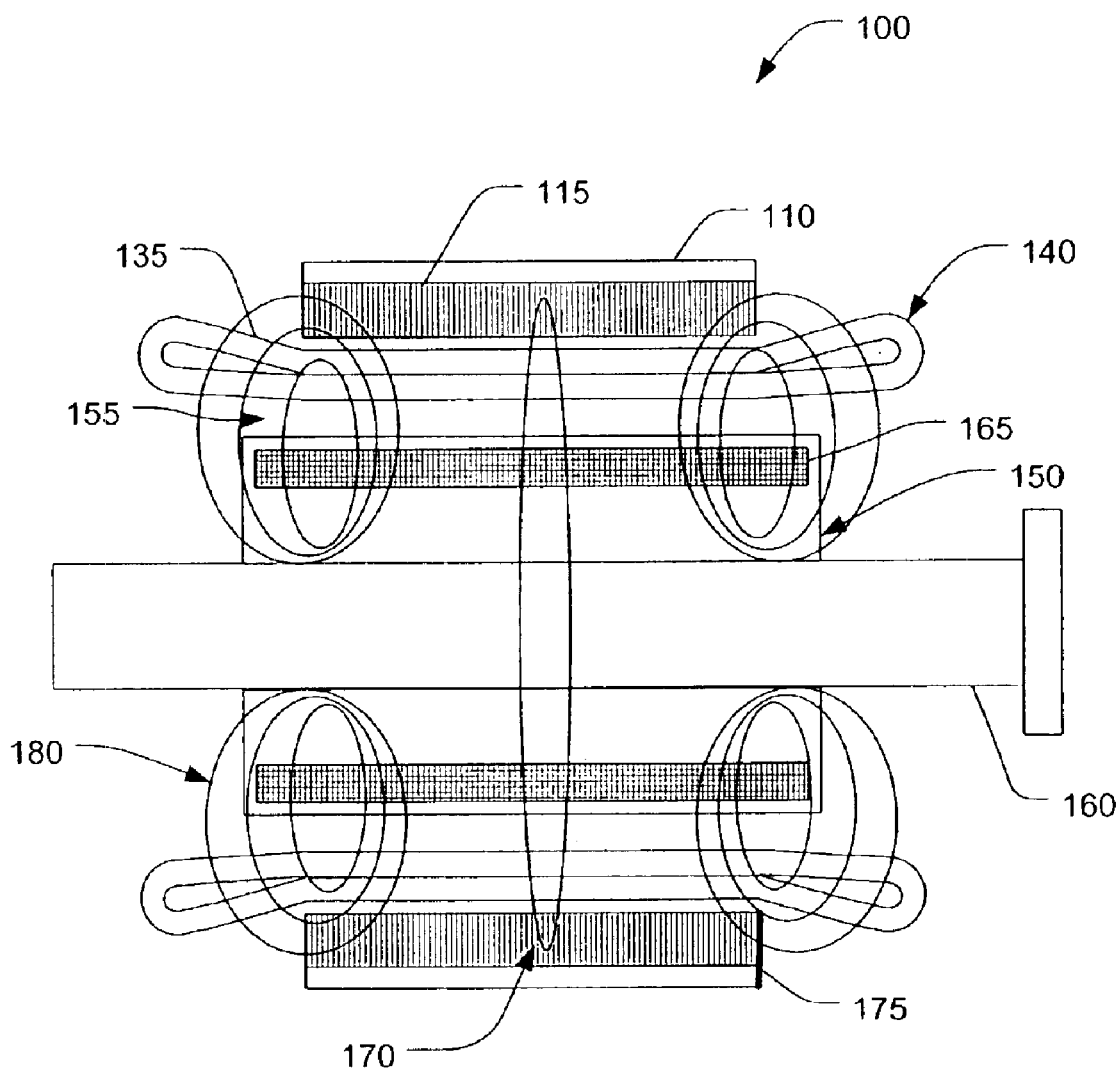
FIG. 1 is a cross sectional view of a conventional air core motor/generator.

The present invention relates to systems and methods for a superconducting synchronous and/or permanent magnet motor/generator including an extended stator core for mitigating eddy current losses. The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a typical air core machine, such as a motor/generator 100. The motor/generator 100 includes a stator assembly, which includes a frame 110 and a cylindrically-shaped stator core 115, the core 115 having an inner surface which defines a bore therein. The core 115 is mounted in a fixed position within the frame 110 by any suitable means, such as by clamping the stator core 115 between interior ribs of the frame 110. The stator core 115 is located radially outward from a stator winding 135. A non-magnetic and non-electrically conducting (e.g., plastic) support structure (not shown) can also be included in the motor/generator 100 to support the stator winding 135.

The stator core 115 is comprised of a plurality of laminated sheets ("stator laminations") of ferromagnetic material such as electrical steel. Laminated sheets are used in the stator core 115 to control eddy currents therein in order to avoid overheating of the stator core 115.

A rotor 150 is centrally located in the bore, with an axis of the rotor 150 being coincident with an axis of the bore. An air gap 155 between the rotor 150 and the stator core 115 is defined by an outer surface of the rotor 150 and the inner surface of the stator core 115. The rotor 150 is suitably axially fixed by means of a shaft 160, which is supported by bearings (not shown). The rotor 150 has a magnetically active portion that preferably comprises a plurality of permanent magnets or superconducting windings 165. In a superconducting synchronous machine, the magnetically active portion of the rotor is the superconducting winding. By definition, the rotor active length is an overall length of a superconducting winding including the end turns. In a permanent magnet machine, the magnetically active portion of the rotor includes the permanent magnets and any ferromagnetic material surrounding the permanent magnets. In this case, by definition, the rotor active length is the total length of the magnetically active portion. Generally, for superconducting machines, the rotor active length is longer than a length of the stator core 115.

In operation of the motor/generator 100, current is passed through the stator winding 135, thereby creating a magnetic field in the bore which is intensified by the ferromagnetic material in the stator core 115. This magnetic field reacts with the magnetic field created by the rotor 150 to produce a torque which turns the rotor 150.

At a center portion of the motor/generator 100, flux 170 travels into the stator laminations 15 in directions substantially parallel to a plane 175 of the stator core laminations. The flux 170, then, rotates circumferentially around the stator core 115. However, at end winding portions 140, flux 180 is pulled into the stator core 115 at a direction substantially perpendicular to the plane 175 of the stator core laminations 115. The perpendicular flux produces eddy currents and causes a substantial increase in temperature in the motor/generator 100.

Figure 2:
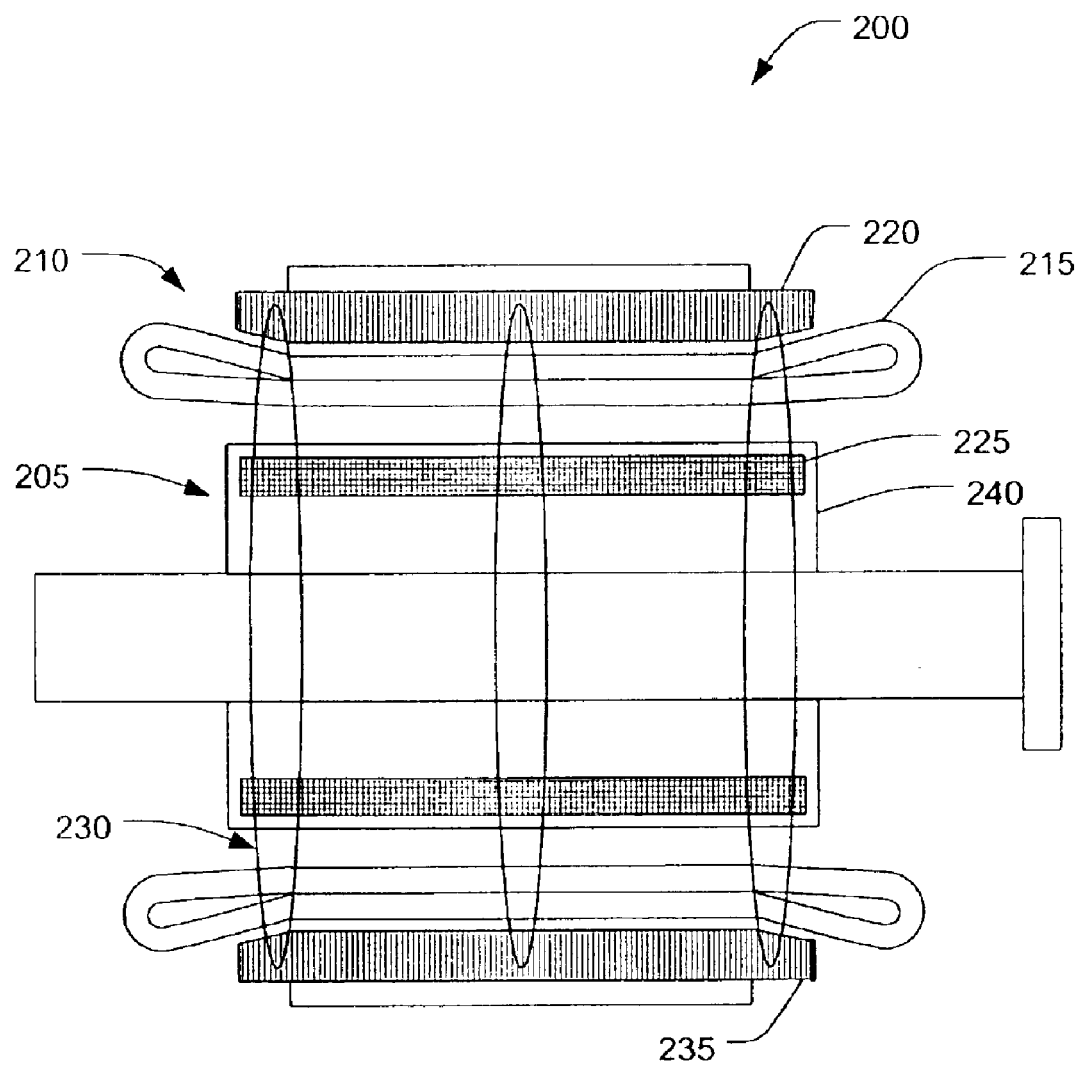
FIG. 2 is a cross sectional view of an exemplary motor/generator having an extended stator core in accordance with an aspect of the present invention.

Turning now to FIG. 2, the present invention provides a motor/generator 200 to mitigate stator flux leakage and eddy current losses. The motor generator 200 comprises a rotor 205 and a stator 210. The stator 210 is arranged concentrically about the rotor 205; and comprises stator windings 215. Further detail relating to configuration and/or operation of the rotor 205 and stator 210 has been described with respect to motor/generator 100 and thus, is limited herein for sake of brevity. However, unlike the conventional motor/generator 100, a stator core 220 is provided which is extended beyond a conventional stator core length. In particular, the stator core 220 is of a length that is substantially equivalent to a rotor active length of the motor/generator 100. For example, in a superconducting motor/generator, the stator core 220 is of a length that is substantially equivalent to an overall outside length of a superconducting winding 225 located in the rotor 205. The superconducting winding 225 can be a high temperature superconductor (HTS) winding. In a permanent magnet machine, the stator core 220 is of a length that is substantially equivalent to a length of a portion of the rotor containing permanent magnets and any ferromagnetic material. Extending the stator core 220 to a full length of the magnetically active portion allows flux 230 to travel into the stator core 220 in directions substantially parallel to a plane 235 of the stator core 220 and to rotate circumferentially around the stator core 220. Thus, eddy current losses, which are typically found in an end region of a superconducting synchronous and/or permanent magnet motor/generator are suppressed.

Typically, an outer diameter of the stator windings 215 increases when moving outward, towards end winding portions. Correspondingly, an inner diameter of the extended stator core 220 also increases. The inner diameter of the extended stator core 220 can be located as close as possible to the stator windings 215, such that a gap created between the core 220 and the windings 215 is small. However, it is to be appreciated that the gap can be of any suitable size and/or shape, and is contemplated as falling within the scope of the present invention.

The rotor 205 can include a vacuum jacket (not shown) surrounding a winding support structure 240 to thermally insulate the superconducting windings 225 and support structure 240 from the environment. The motor/generator 200 can also be coupled to a cryogenic refrigeration system (not shown) for cooling the superconducting windings 225 of the rotor 205.

Figure 3:
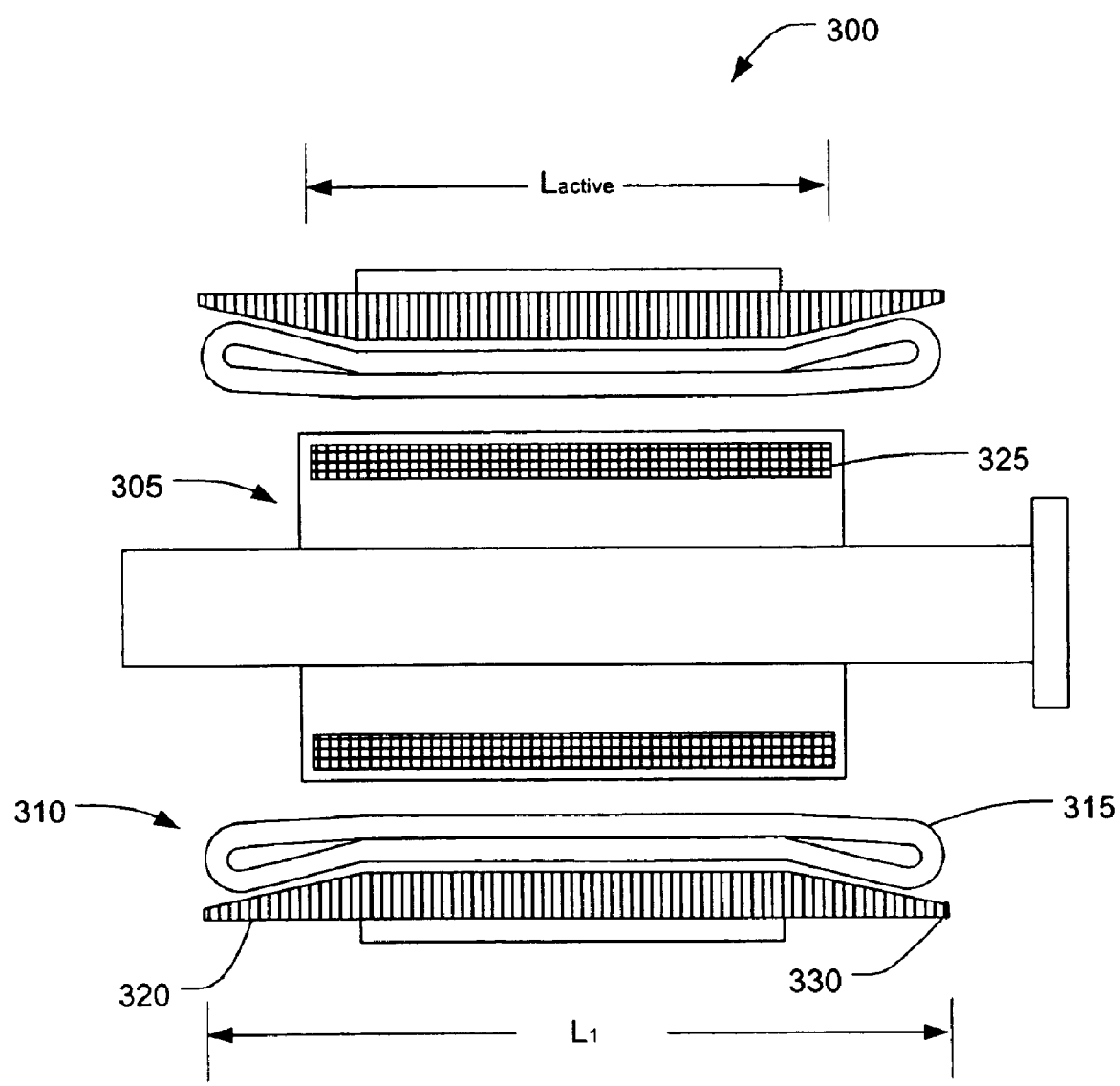
FIG. 3 is a cross sectional view of an exemplary motor/generator having an extended stator core in accordance with an aspect of the present invention.

Turning now to FIG. 3, another example of a motor/generator 300 is depicted in accordance with an aspect of the present invention. The motor generator 300 comprises a rotor 305 and a stator 310. The stator 310 comprises stator windings 315 and a stator core 320. The stator core 320 is extended to a length that is substantially equivalent to or longer than a length of the stator windings 315 of the motor/generator 300. The greater the length of the extended core 320, the greater the losses due to currents in the stator windings 315 are decreased. As discussed above, when the length of the stator core 320 is extended, flux in end winding portions of the stator windings 315 is passed through the extended stator core 320 substantially parallel with a plane 330 of the extended stator core 320, which operates to mitigate eddy current loss.

Figure 4:
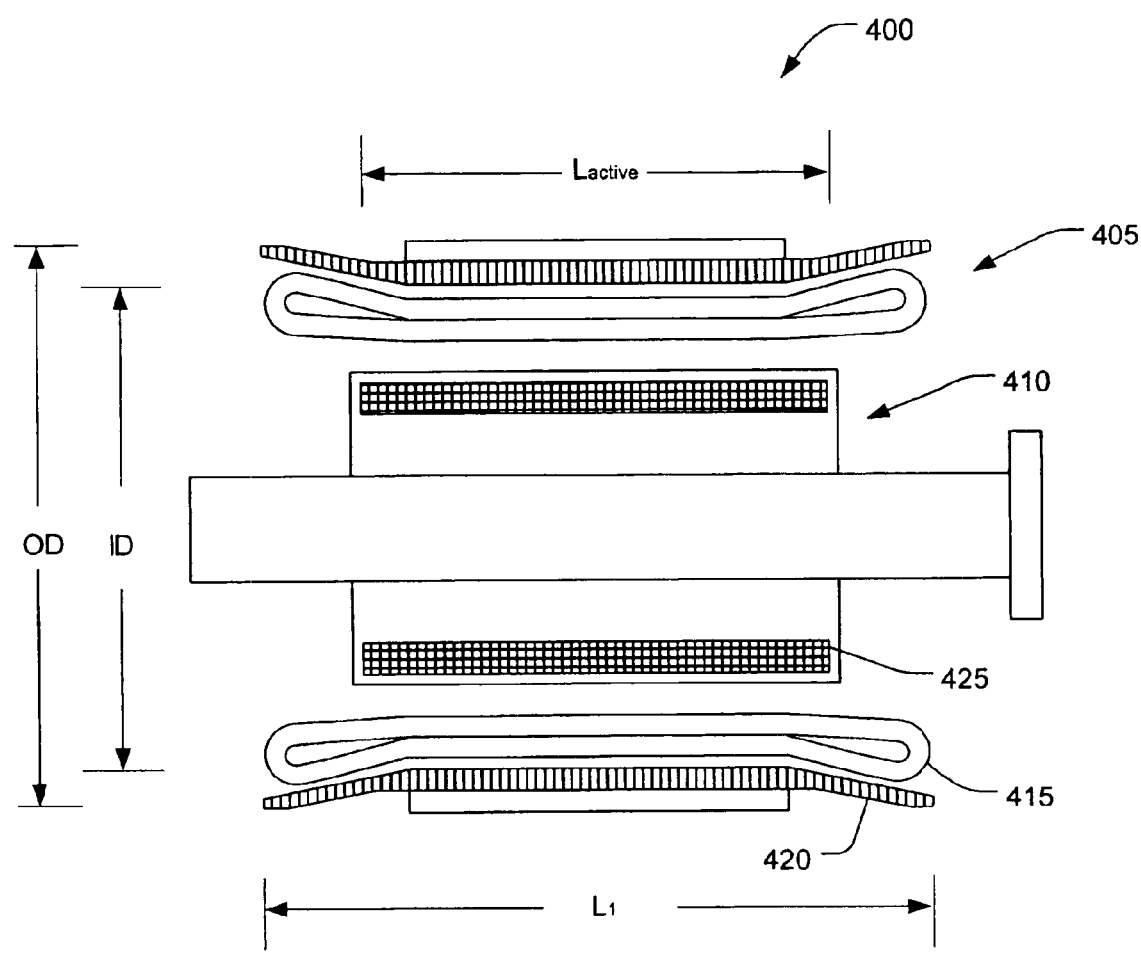
FIG. 4 is a cross sectional view of an exemplary motor/generator having an extended stator core with a variable outside diameter in accordance with an aspect of the present invention.

FIG. 4 illustrates yet another example of a motor/generator 400 in accordance with an aspect of the present invention. The motor/generator 400 includes a stator 405 arranged concentrically about a rotor 410. The stator 405 comprises stator windings 415 and a stator core 420. The stator core 420 is extended to any length suitable, as described herein, for decreasing losses in an end region of the motor/generator 400. For example, the length, L1, of the stator core 420 can be substantially equivalent to or longer than the active length Lactive, in the rotor 410. For example, in a superconducting motor, the magnetically active portion is a superconducting winding 425, including end turns, located in the rotor 410. In a permanent magnet machine, the magnetically active portion includes permanent magnets as well as any ferromagnetic material. In particular, the length of the stator core 420 can be substantially equivalent to a length of the stator windings 415. Moreover, the extended stator core 420 can include a variable outside diameter (OD) and an inner diameter (ID). Having a variable outside diameter (OD) for the stator core 420 facilitates a decrease in weight of the stator core; and thus, a decrease in weight for the overall motor/generator 400. Moreover, employing a variable outside diameter (OD) facilitates a decrease in the amount of material employed during manufacture of the stator core 420.

Figure 5:
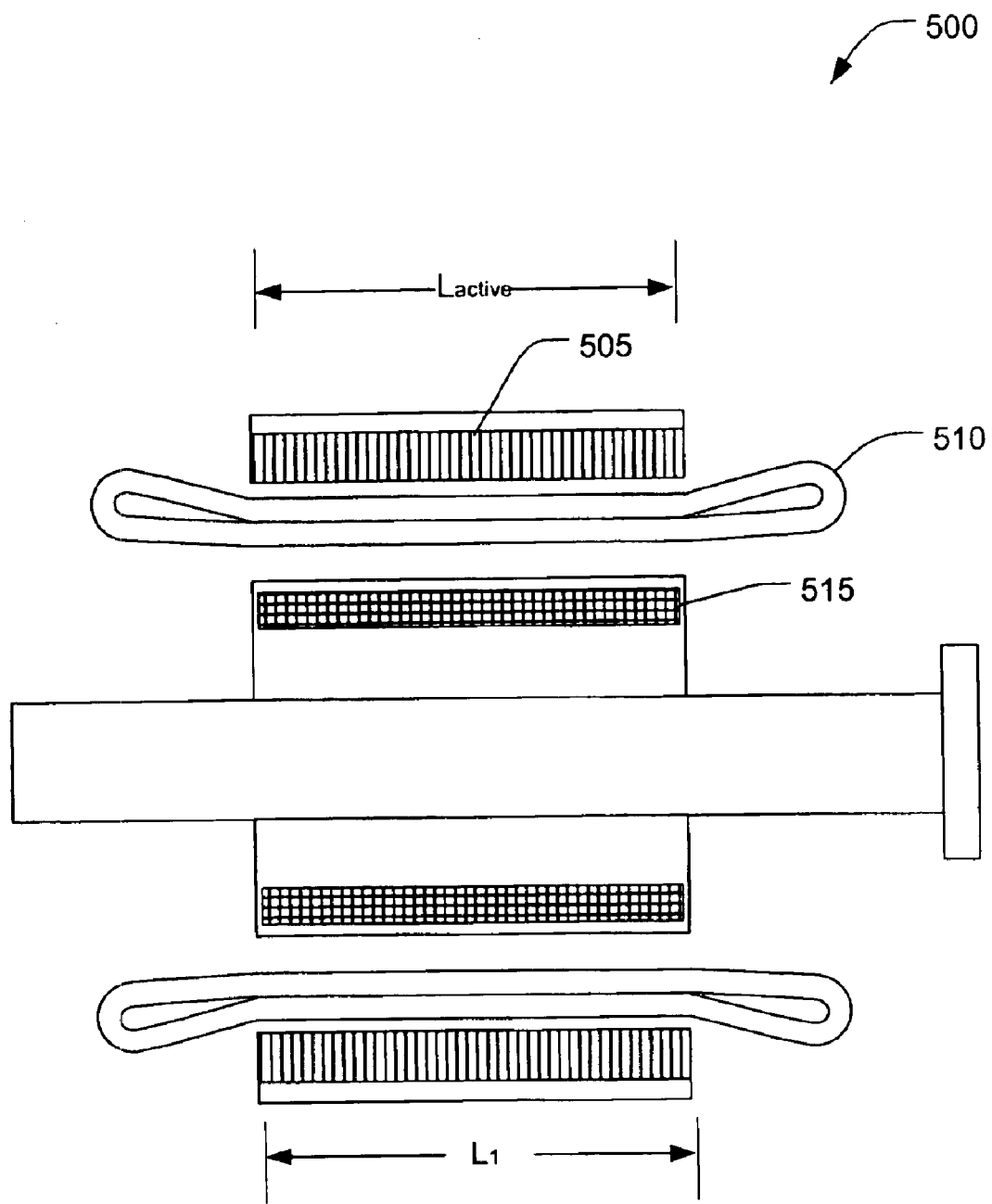
FIG. 5 is a cross sectional view of an exemplary motor/generator having a shortened magnetically active portion in a rotor in accordance with an aspect of the present invention.

Although, the present invention has been illustrated herein as including an extended core, losses in end regions of a motor/generator can also be mitigated by shortening a magnetically active portion of a rotor, as depicted in FIG. 5. A motor/generator 500 can include a stator core 505 of conventional length. Accordingly, magnetically active portion of the rotor 515 can be of a length Lactive that is substantially equivalent to an overall length of the stator core 505. However, too much shortening of the magnetically active portion 515 can result in a loss in torque of the motor/generator 500. Thus, the present invention may balance torque coupling, material usage, and an efficiency of the motor/generator 500. For example, the length of the magnetically active portion 515 can be optimized with respect to the stator core 505 such that torque produced in the motor/generator 500 is not compromised. Thus, the magnetically active portion 515 can be of a plurality of lengths based on design preferences. For example, in accordance with one aspect, the length of the magnetically active portion 515 can be substantially equivalent to the length of the stator core 505.

Figure 6:
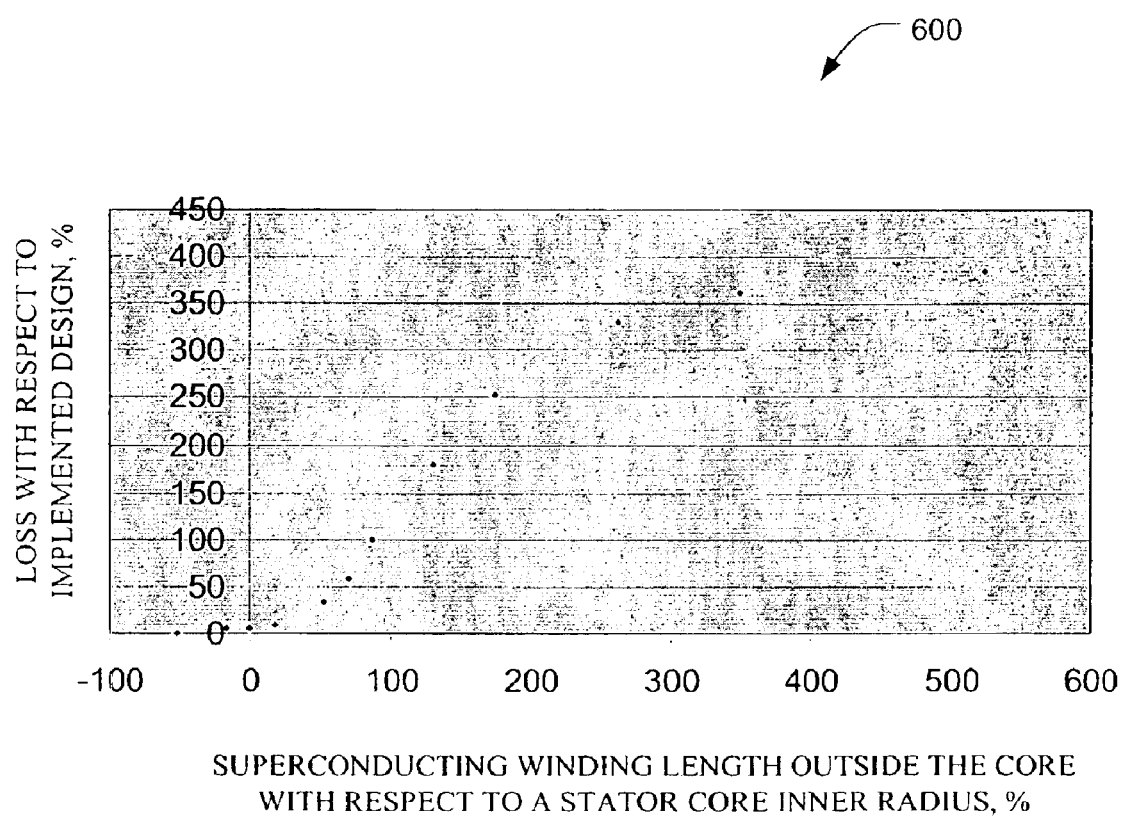
FIG. 6 is an illustration of core loss dependency on the active length of the superconducting motor relative to the length of the stator core.

In accordance with another aspect, a magnetically active portion of the rotor can be longer than the length of the stator core 505 by a length ranging from near zero to a value equivalent to about fifty percent of the inner radius of the stator core 505. As illustrated in graph 600 of FIG. 6, losses in a superconducting motor/generator are dependent upon a relative length of superconducting windings and a stator core. On FIG. 6, the chosen measure (for the horizontal axis of the graph) is the ratio of the difference between the length of the superconducting winding 515 and the length of the stator core 505 to the inner radius of the stator core. For example, when this ratio is near zero, or negative, the losses are near zero. When this ratio increases, the losses grow rapidly in any practical range of the motor/generator design parameters.

Although a plurality of stator core shapes have been described herein, it is to be appreciated that an extended stator core employed in a motor/generator for mitigating losses in an end region of the motor/generator can be of any suitable shape; and thus, is contemplated as falling within the scope of the present invention. Preferably, a stator core can be shaped such that it optimizes flux; for example, the shape of the core may vary depending on a superconducting winding design. Moreover, although the stator core has been described herein as comprising laminated sheets of ferromagnetic material, the stator core can be partially or entirely made from, for example, at least one of: ferrite material, steel wire filament wound composite structure, steel tape wound composite structure, braided steel wire composite structure.

Further, although the motor/generators of the subject application have been substantially described herein as superconducting motor/generators having superconducting windings and permanent magnet machines, it is to be appreciated that synchronous machines having conventional windings and/or any other large air core machines can also be employed.

Figure 7:
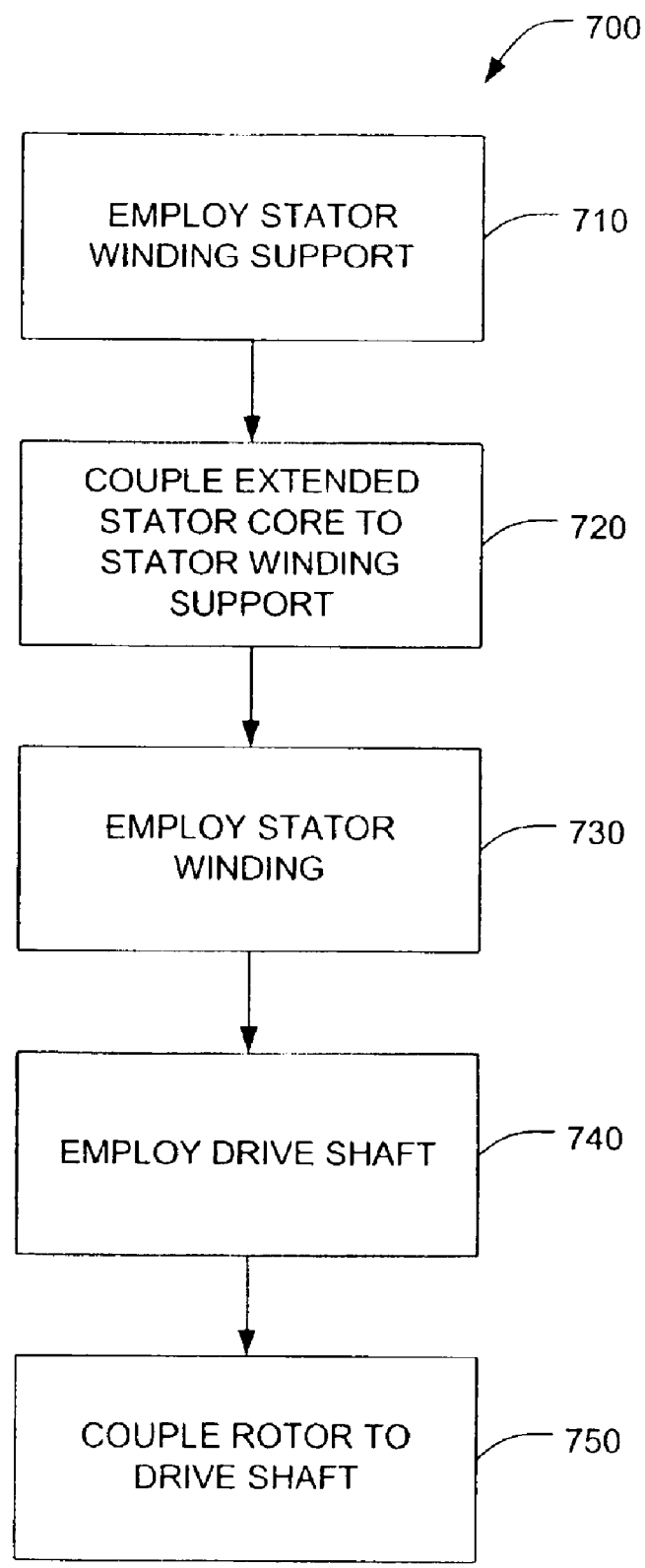
FIG. 7 is a flow diagram of a methodology for fabricating a motor/generator in accordance with an aspect of the present invention.
Figure 8:
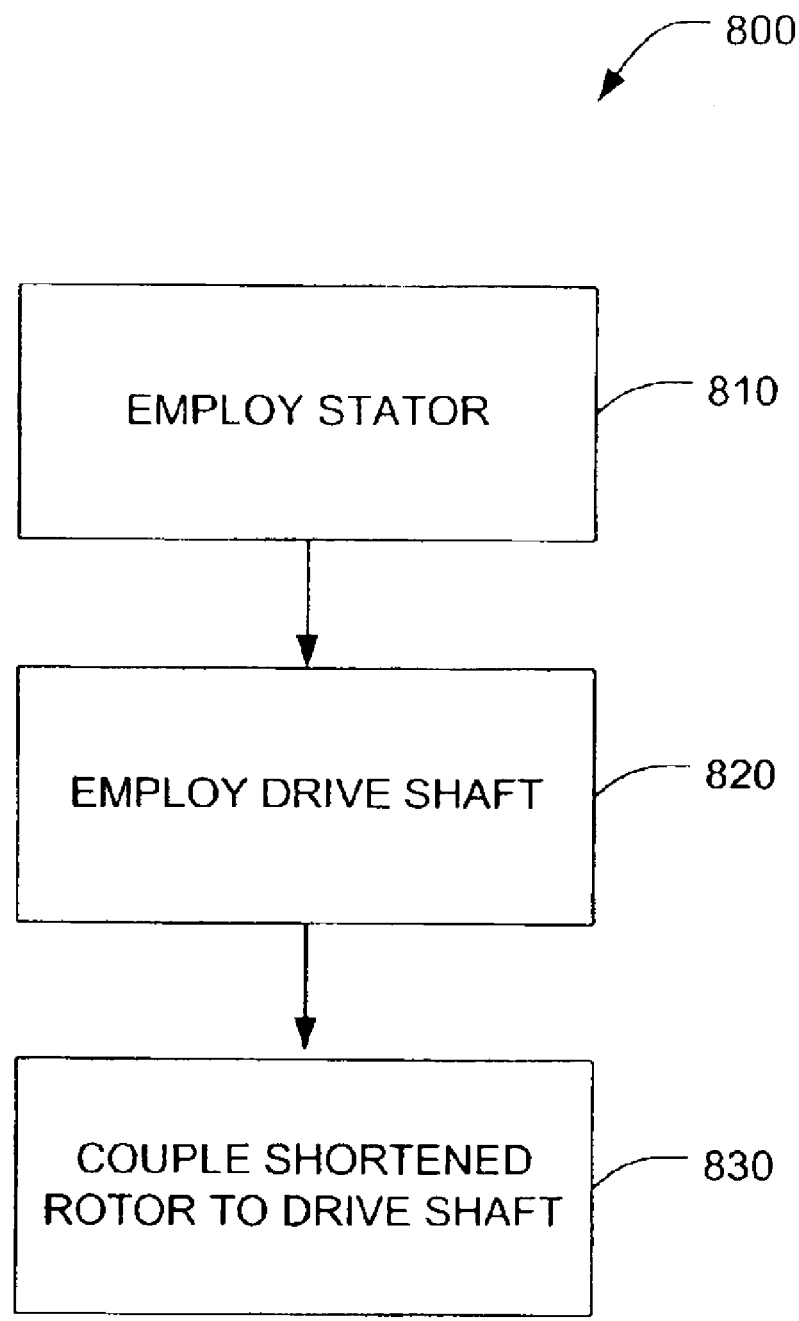
FIG. 8 is a flow diagram of a methodology for fabricating a motor/generator in accordance with an aspect of the present invention.

In view of the foregoing structural and functional features described above, methodologies in accordance with various aspects of the present invention will be better appreciated with reference to FIGS. 7–8. While, for purposes of simplicity of explanation, the methodologies of FIGS. 7–8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Turning now to FIG. 7, a methodology 700 for fabricating a motor/generator is depicted. The methodology 700 begins at 710 where a non-magnetic and non-electrically conducting (e.g., plastic) stator winding support for the motor/generator is employed. At 720, an extended stator core is coupled to the plastic stator winding support. The extended stator core can be of a length that is substantially equivalent to or longer than a magnetically active portion in a rotor of the motor/generator. The extended stator core can be manufactured partially or entirely from, for example, at least one of: ferrite material, steel wire filament wound composite structure, steel tape wound composite structure, braided steel wire composite structure. At 730, a stator winding is disposed into the non-magnetic stator winding support located inside of the extended stator core. At 740, a drive shaft is employed and a rotor is coupled to the drive shaft at 750.

FIG. 8 illustrates another methodology 800 for fabricating a motor/generator in accordance with an aspect of the present invention. At 810, a stator and stator core assembly is employed in connection with the motor/generator. Then, at 820, a drive shaft is employed for the motor/generator. At 830, a rotor having a shortened magnetically active portion, as described herein, is coupled to the drive shaft. The magnetically active portion can have a length that is substantially equivalent to a length of a stator core. Alternatively, in a superconducting motor the length of a superconducting winding can be longer than the stator core by a length ranging from near zero to a value equivalent to about fifty percent of the inner radius of the stator core. However, it is to be appreciated, that the superconducting windings can be of any suitable length with respect to the stator core while balancing an optimal flux with a design of the superconducting windings.

It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A motor/generator, comprising:
   a drive shaft;
   a rotor coupled to the drive shaft, the rotor having a superconducting winding;
   a stator winding to facilitate rotation of the rotor; and
   a stator core,
   wherein the superconducting winding is longer than the stator core by a length ranging from near zero to a value equivalent to about fifty percent of an inner radius of the stator core.

2. The motor/generator of claim 1, wherein the length of the superconducting winding is longer than the stator core by a length ranging from near zero to a value equivalent to about forty percent of an inner radius of the stator core.

3. The motor/generator of claim 1, wherein the length of the superconducting winding is longer than the stator core by length ranging from near zero to a value equivalent to about thirty percent of an inner radius of the stator core.

4. The motor/generator of claim 1, wherein the length of the superconducting winding is longer than the stator core by a length ranging from near zero to a value equivalent to about twenty percent of an inner radius of the stator core.

5. The motor/generator of claim 1, wherein the length of the superconducting winding is longer than the stator core by a length ranging from near zero to a value equivalent to about ten percent of an inner radius of the stator core.

6. The motor/generator of claim 1 is a superconducting synchronous motor/generator.

7. The motor/generator of claim 1, the stator core includes a plurality of laminates manufactured from ferromagnetic material.

8. The motor/generator of claim 1, the stator core is manufactured partially or entirely from at least one of: ferrite material, steel wire filament wound composite structure, steel tape wound composite structure, braided steel wire composite structure.

* * * * *